(12) United States Patent
Tanaka et al.

(10) Patent No.: US 9,578,340 B2
(45) Date of Patent: Feb. 21, 2017

(54) IMAGE PROCESSING APPARATUS, METHOD OF CONTROLLING THE SAME, AND RECORDING MEDIUM

(71) Applicant: CANON KABUSHIKI KAISHA, Tokyo (JP)

(72) Inventors: Eiichi Tanaka, Yokohama (JP); Yoshinori Hayashi, Tokyo (JP); Koji Okawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 522 days.

(21) Appl. No.: 13/964,577

(22) Filed: Aug. 12, 2013

(65) Prior Publication Data

US 2014/0064371 A1 Mar. 6, 2014

(30) Foreign Application Priority Data

Aug. 31, 2012 (JP) ................................. 2012-192292

(51) Int. Cl.
| | | |
|---|---|---|
| H04N 19/174 | (2014.01) | |
| H04N 19/146 | (2014.01) | |
| H04N 19/105 | (2014.01) | |
| H04N 19/172 | (2014.01) | |
| H04N 19/91 | (2014.01) | |
| H04N 19/46 | (2014.01) | |
| H04N 19/115 | (2014.01) | |

(52) U.S. Cl.
CPC .......... *H04N 19/174* (2014.11); *H04N 19/105* (2014.11); *H04N 19/146* (2014.11); *H04N 19/172* (2014.11); *H04N 19/46* (2014.11); *H04N 19/91* (2014.11); *H04N 19/115* (2014.11)

(58) Field of Classification Search
CPC ... H04N 19/00684; H04N 19/46; H04N 19/91
USPC .............. 375/240.1, 240.16, 240.03, 240.12; 386/241; 382/164
See application file for complete search history.

(56) References Cited

U.S. PATENT DOCUMENTS

| | | | | |
|---|---|---|---|---|
| 7,782,936 | B2 * | 8/2010 | Kondo | ............. H04N 19/00018 375/240.01 |
| 8,175,407 | B2 * | 5/2012 | Okawa | .................. G06K 9/622 382/164 |
| 8,396,307 | B2 | 3/2013 | Nakagami et al. | |
| 9,330,717 | B2 | 5/2016 | Tanaka et al. | |
| 2002/0054638 | A1 * | 5/2002 | Hanamura | ............. H04N 19/36 375/240.03 |
| 2004/0141555 | A1 * | 7/2004 | Rault | ..................... H04N 19/56 375/240.16 |
| 2007/0230565 | A1 * | 10/2007 | Tourapis | .............. H04N 19/105 375/240.01 |

(Continued)

FOREIGN PATENT DOCUMENTS

| | | |
|---|---|---|
| CN | 1739297 A | 2/2006 |
| CN | 101273638 A | 9/2008 |

(Continued)

OTHER PUBLICATIONS

Chinese Office Action dated Apr. 25, 2016, in counterpart Chinese Application No. 201310392196.9.

*Primary Examiner* — David N Werner
(74) *Attorney, Agent, or Firm* — Fitzpatrick, Cella, Harper & Scinto (57) ABSTRACT

If the picture identifier of a first frame and the picture identifier of a second frame match, a rewriting unit rewrites the picture identifier and the slice type of the first frame.

12 Claims, 8 Drawing Sheets

(56) References Cited

U.S. PATENT DOCUMENTS

| | | | |
|---|---|---|---|
| 2007/0291841 A1* | 12/2007 | Muraki | H04N 7/50 375/240.12 |
| 2009/0219989 A1* | 9/2009 | Tanaka | G11B 27/034 375/240.01 |
| 2009/0232199 A1* | 9/2009 | Kobayashi | H04N 19/00 375/240.01 |
| 2010/0021142 A1* | 1/2010 | Minami | H04N 19/70 386/241 |
| 2010/0142835 A1 | 6/2010 | Nakagami et al. | |
| 2014/0016915 A1 | 1/2014 | Tanaka et al. | |

FOREIGN PATENT DOCUMENTS

| | | |
|---|---|---|
| CN | 101461246 A | 6/2009 |
| JP | 4757840 B2 | 8/2011 |

* cited by examiner

| GOLOMB CODE | DATA VALUE RANGE |
|---|---|
| 1 | 0 |
| 0 1 x | 1-2 |
| 0 0 1 x x | 3-6 |
| 0 0 0 1 x x x | 7-14 |
| 0 0 0 0 1 x x x x | 15-30 |
| 0 0 0 0 0 1 x x x x x | 31-62 |
| 0 0 0 0 0 0 1 x x x x x x | 63-126 |
| 0 0 0 0 0 0 0 1 x x x x x x x | 127-254 |
| 0 0 0 0 0 0 0 0 1 x x x x x x x x | 255-510 |

| | GOLOMB CODE | DATA VALUE |
|---|---|---|
| BEFORE 4-BIT EXTENSION | 0 1 1 | 2 |
| AFTER 4-BIT EXTENSION | 0 0 0 1 1 0 0 | 11 |

FIG. 11

| | GOLOMB CODE | DATA VALUE |
|---|---|---|
| BEFORE 4-BIT SHORTENING | 0 0 0 1 1 0 1 | 12 |
| AFTER 4-BIT SHORTENING | 0 1 1 | 2 |

IMAGE PROCESSING APPARATUS, METHOD OF CONTROLLING THE SAME, AND RECORDING MEDIUM

BACKGROUND OF THE INVENTION

Field of the Invention

The present invention relates to an image processing apparatus, a method of controlling an image processing apparatus, and a recording medium.

Description of the Related Art

Recent years have seen an increase in the number of devices that can shoot moving images using intra-frame encoding for easy editing after shooting. Unlike the case of inter-frame encoding, intra-frame encoded images do not need so-called reference images. Accordingly, decoding requires only the data for one encoded image, and it is easy to perform an editing task such as clipping a still image from a moving image.

Although this is convenient, there is also the disadvantage that the encoding efficiency is poor compared to the case of using inter-frame encoding. The encoding rate is generally higher in the case of MotionJPEG, which uses only intra-frame encoding, than in the case of MPEG, in which a moving image is encoded using inter-frame encoding. MPEG has therefore often been used for moving image encoding even though editing tasks require more effort.

Meanwhile, due to the prevalence of the H.264 system that enables more efficient image encoding than JPEG and MPEG, attention has once again been given to the intra-frame encoding of moving images. H.264 employs many tools for raising efficiency even simply with respect to intra-frame encoding, such as intra-frame prediction and the ability to adaptively change the prediction block size.

H.264 uses a special intra-frame encoded picture called an IDR (Instantaneous Decoding Refresh) picture (referred to hereinafter as an IDR picture). When an IDR picture is inserted, all of the states necessary for stream decoding are reset (the head of an H.264 stream always needs to be an IDR picture). On the other hand, there are no other restrictions with respect to IDR pictures, and IDR pictures may be inserted at any timing after the head. In other words, all of the frames may be IDR pictures, and it is possible for none of the frames after the head frame to be IDR pictures.

Besides an IDR picture, there is also a normal I picture type of intra-frame encoded frame. This I picture is the same as the I picture employed in MPEG, and can be understood in the sense of being the head of a so-called GOP. In the image data portion of a stream, an IDR picture and an I picture have no difference in terms of encoding efficiency or the like.

Accordingly, when creating a moving image using an image encoding system that employs only intra-frame encoding (referred to hereinafter as an ALL-I picture system), two methods can be used, namely using all IDR pictures, or also including I pictures (or using all I pictures except for the head, for example). However, a different problem arises in the case where, for example, a stream within a moving image that includes an IDR picture is deleted, and the streams before and after the deleted stream are joined.

Each IDR picture has a parameter called a picture identifier (idr_pic_id), and this needs to be written in the header. In H.264, the picture identifier is encoded along with the picture image in an IDR picture using a variable-length encoding system called Golomb coding.

Figure 8:
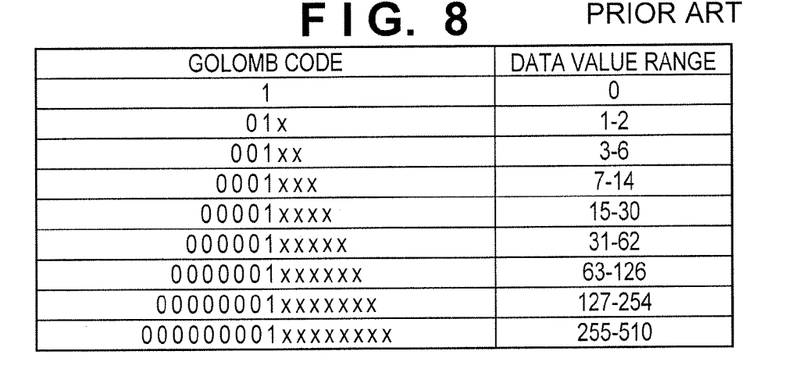
FIG. 8 is a diagram showing Golomb codes and data value ranges.

The following describes Golomb coding with reference to the table in FIG. 8, as one example of a technique for variable-length encoding of the picture identifier. The column on the left in the table in FIG. 8 shows Golomb codes (binary numbers), and the column on the right shows the ranges of data values (decimal numbers) that can be expressed. The "1" portion in the Golomb codes in the table in FIG. 8 is called the separator, the "0" portion on the left side of the separator in the center is called the prefix, and the portion on the right side of the separator is called the suffix. In the table in FIG. 8, "x" is used to express the suffix, and "x" can take the value of either 0 or 1. The number of 0s in the prefix is represented by the bit length of the suffix, and the bit length is the same on the left and right of the separator in the center.

For example, if the prefix consists of two 0s, the suffix also has a bit length of 2.

In the table in FIG. 8, the four values 3 to 6 can be expressed in the third row from the top. This is shown specifically below.

Golomb code: 00100=data value: 3
Golomb code: 00101=data value: 4
Golomb code: 00110=data value: 5
Golomb code: 00111=data value: 6

As an exception, only when the data value is 0, there is no prefix or suffix. Making the conversion of numerical values variable in this way improves the encoding efficiency.

According to H.264 recommendations, the picture identifier may have any value from 0 to 65535, but there is the stipulation that the same picture identifier must not be used consecutively in the case where IDR pictures are adjacent to each other. The same picture identifier may be used multiple times in a moving image as long as the same picture identifier is not assigned consecutively to adjacent IDR pictures.

However, when an editing task is performed, there is the possibility of the same picture identifier being used consecutively after editing. If the same picture identifier is used consecutively after editing, it is sufficient to alter either one of the picture identifiers, but since the picture identifier is encoded in a variable-length manner (Golomb coding) as described above, there are cases where it is not possible for just that value to be edited.

For example, if the picture identifier of two consecutive IDR pictures both have the value of 0, the Golomb code will be expressed by the one-bit value of 1. According to the stipulation that the same picture identifier must not be used consecutively, either one of the picture identifiers needs to be changed, but the Golomb-coded bit cannot have any value other than 1.

A problem also arises in the case where the picture identifier for two consecutive IDR pictures is 1, and furthermore the preceding and succeeding picture identifiers are 2. According to the table in FIG. 8, the Golomb code is "010" when the picture identifier is 1. Besides 1, the other value that can be expressed with this bit length is the value of 2, which is represented by the Golomb code "011". When consecutive IDR pictures have the same picture identifier, either one of the picture identifiers needs to be replaced with a number other than 1, but in this case, the only other value that can be selected is 2. However, if one of the picture identifiers is changed to 2, it will be the same as the picture identifier of the other adjacent IDR picture, thus further requiring another modification.

In this way, it becomes necessary to search for and modify the picture identifiers of a large number of IDR pictures. Depending on the case, a situation can occur in which it is impossible to avoid duplicate values. In such a case, it is necessary to either perform re-encoding or change the editing location to a location other than the desired location.

As a technique for resolving the above-described problem, there is a method in which, if it is not possible for just the picture identifier to be edited, padding bits or the like are deleted, and the bit length allocated to the picture identifier is increased (Japanese Patent No. 4757840).

Figure 9:
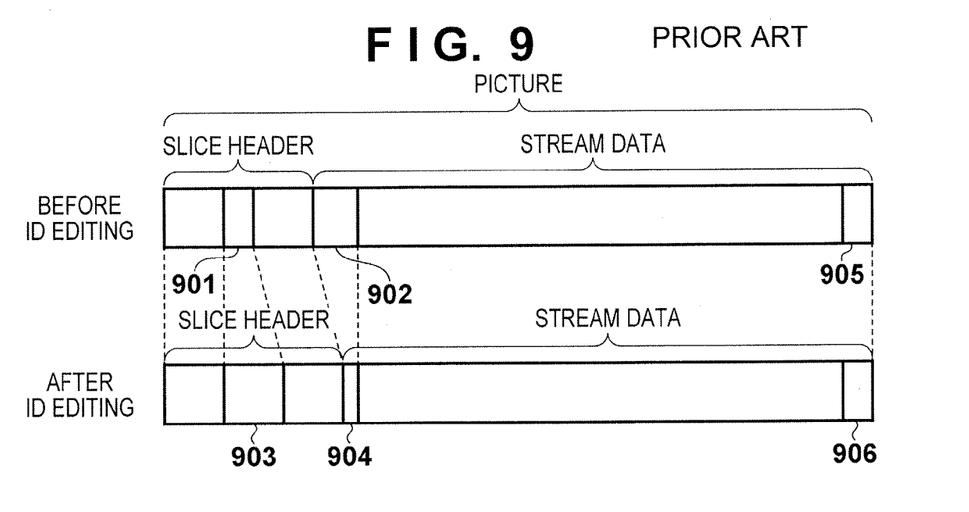
FIG. 9 is a diagram for describing stream editing in a conventional apparatus.

The following describes an embodiment proposed in Japanese Patent No. 4757840 with reference to FIG. 9. Before the picture identifier is edited, an IDR picture includes the following.

Picture identifier 901 in the header (idr_pic_id)

Padding bits 902 (cabac_alignment_one_bit) inserted to adjust the bit length of the stream data Padding bits 905 (trailing_zero_8 bits) inserted at the end of the data After the picture identifier is edited, the IDR picture includes the following.

Picture identifier 903 extended by N bits to make the picture identifier 901 changeable Padding bits 904 (cabac_alignment_one_bit) that is N bits shorter than the padding bits 902

Padding bits 906 (trailing_zero_8 bits) inserted at the end of the data to adjust the bit length Here, if it is not possible for just the picture identifier to be edited, the bit length of the picture identifier 901 is increased by N bits to obtain the picture identifier 903 extended by N bits in order to make it possible to change the Golomb code. However, without doing anything else, the overall bit length of the picture will increase by N bits, and it is possible for stream to no longer be a proper H.264 stream. In view of this, in order to adjust the number of bits, cabac_alignment_one_bit 902 is reduced by N bits, which is the amount of increase, thus obtaining the padding bits 904 and preventing an increase in the overall number of bits. However, cabac_alignment_one_bit 902 is image-dependent data, and it is possible to not have enough leeway to reduce it by N bits. In this case, the trailing_zero_8 bits 905 added to the end of the stream data is reduced by the amount of increase, thus obtaining the padding bits 906. Since the trailing_zero_8 bits is also image-dependent, there are cases where this data does not exist. In such a case, balance is achieved using the next slice data. In this kind of method, editing is relatively easy in the case where there is a parameter that enables adjusting the bit length in order to edit the picture identifier at the head of the data, but if such a parameter does not exist, there is the risk of processing becoming complex due to the need to analyze the stream and adjust padding bits.

SUMMARY OF THE INVENTION

In view of this, in the case of editing a moving image, the present invention makes it easier to change a picture identifier in order to prevent the same picture identifier from being consecutive in the edited moving image, and enables alleviating the load when performing editing processing.

One aspect of embodiments of the invention relates to an image processing apparatus having an editing unit configured to edit a moving image, an analysis unit configured to analyze a header of a predetermined frame included in the moving image and acquires a slice type and a picture identifier, and a rewriting unit configured to rewrite a header of a frame included in the moving image, wherein the analysis unit analyzes a header of a first frame and a header of a second frame and acquires the slice type and the picture identifier of the first frame and the slice type and the picture identifier of the second frame, the first frame and the second frame being frames that were not adjacent before editing performed by the editing unit and are adjacent to each other after the editing, and in a case where the picture identifier of the first frame and the picture identifier of the second frame match, the rewriting unit rewrites the picture identifier and the slice type of the first frame.

Another aspect of embodiments of the invention relates to a method of controlling an image processing apparatus, the image processing apparatus comprising, an editing unit configured to edit a moving image, an analysis unit configured to analyze a header of a predetermined frame included in the moving image and acquires a slice type and a picture identifier, and a rewriting unit configured to rewrite a header of a frame included in the moving image, and the method comprising the steps of, controlling the analysis unit so as to analyze a header of a first frame and a header of a second frame and acquire the slice type and the picture identifier of the first frame and the slice type and the picture identifier of the second frame, the first frame and the second frame being frames that were not adjacent before editing performed by the editing unit and are adjacent to each other after the editing, and controlling, in a case where the picture identifier of the first frame and the picture identifier of the second frame match, the rewriting unit so as to rewrite the picture identifier and the slice type of the first frame.

Further aspect of embodiments of the invention relates to a recording medium storing a program for controlling an image processing apparatus, the image processing apparatus comprising an editing unit configured to edit a moving image, an analysis unit configured to analyze a header of a predetermined frame included in the moving image and acquires a slice type and a picture identifier, and a rewriting unit configured to rewrite a header of a frame included in the moving image, and the program comprising controlling the analysis unit so as to analyze a header of a first frame and a header of a second frame and acquire the slice type and the picture identifier of the first frame and the slice type and the picture identifier of the second frame, the first frame and the second frame being frames that were not adjacent before editing performed by the editing unit and are adjacent to each other after the editing, and controlling, in a case where the picture identifier of the first frame and the picture identifier of the second frame match, the rewriting unit so as to rewrite the picture identifier and the slice type of the first frame.

Further features of the present invention will become apparent from the following description of exemplary embodiments with reference to the attached drawings.

DESCRIPTION OF THE EMBODIMENTS

Embodiments of the present invention will be described in detail below with reference to the accompanying drawings.

Embodiment 1

Hereinafter, a moving image editing apparatus as an image processing apparatus according to Embodiment 1 of the present invention will be described with reference to FIG. 1. A moving image whose frames are all of the IDR picture type is input to a moving image editing apparatus 101. This moving image is referred to hereinafter as an "encoded image" in this specification. An encoded image 102 is input to the moving image editing apparatus 101, and an edited encoded image 110 is output. The moving image editing apparatus 101 has an encoded image analysis unit 103, an external setting input 104 for receiving the input of a setting from the outside, a deletion range setting unit 105, an encoded image deletion unit 106 that generates a trimmed encoded image 107 from the encoded image 102, a header analysis unit 108, and a header rewriting unit 109. The encoded image analysis unit 103, the deletion range setting unit 105, and the encoded image deletion unit 106 function as a moving image editing unit.

Figure 1:
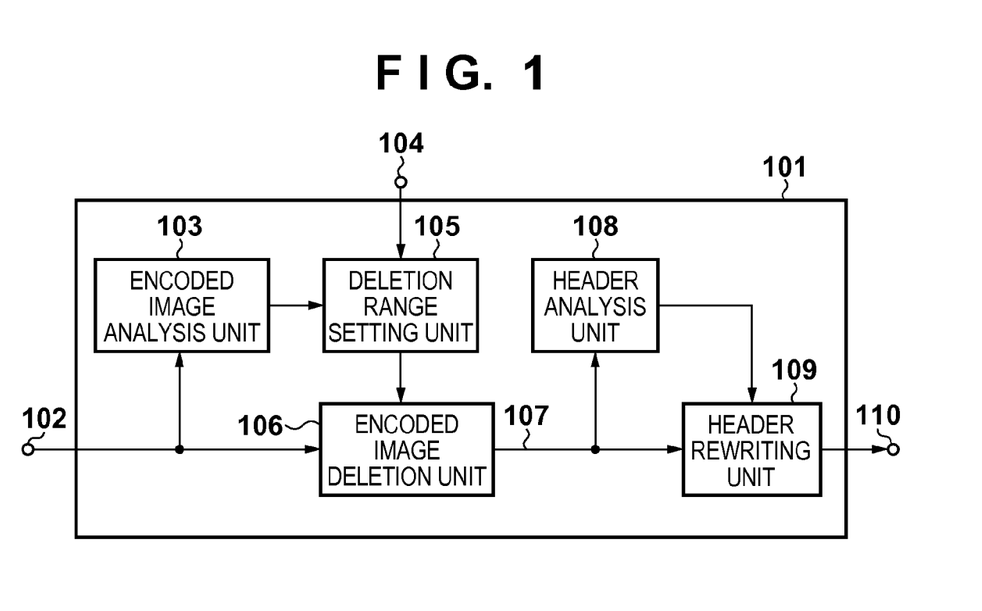
FIG. 1 is a block diagram showing an overview of the configuration of a moving image editing apparatus 101 according to Embodiment 1 of the invention.

Note that the blocks of the moving image editing apparatus 101 in FIG. 1 may be configured by hardware, using dedicated logic circuits and memory. Alternatively, the blocks may be configured by software, through a computer including a CPU and the like executing processing programs stored in a memory.

Next, operations of the blocks shown in FIG. 1 will be described. The moving image editing apparatus 101 of the present embodiment can edit moving images encoded in "ITU-T Rec. H.264|ISO/IEC 14496-10 Advanced Video Coding" (referred to hereinafter as "H.264"). The encoded image analysis unit 103 outputs, to the deletion range setting unit 105, position information for pictures in a stream as configuration information for the input encoded image 102. Based on the configuration information from the encoded image 102, the deletion range setting unit 105 outputs, to the encoded image deletion unit 106, position information regarding a range of pictures to be deleted from the encoded image 102, in accordance with the external setting input 104, which is a user designation or the like.

The encoded image deletion unit 106 deletes, from the encoded image 102, a deletion range of frames from a deletion start point to a deletion end point, which were instructed by the deletion range setting unit 105, and outputs the resulting trimmed encoded image 107 to the header analysis unit 108 and the header rewriting unit 109.

The header analysis unit 108 analyzes the header of the frame immediately before the deletion start point of the trimmed encoded image 107 and the header of the frame immediately after the deletion end point, that is to say, the headers of the frames that have become adjacent (successive) for the first time due to the deletion. Note that in this analysis, the above-described deletion range picture position information may be acquired from the deletion range setting unit 105. The header analysis unit 108 extracts idr_pic_id, which is a picture identifier, and slice_type, which is a slice type, from the headers of the frames, and outputs them to the header rewriting unit 109.

The header rewriting unit 109 checks the acquired slice_types and idr_pic_ids (picture identifiers). If the idr_pic_id of the frame immediately before the deletion start point (first frame) and the idr_pic_id of the frame immediately after the deletion end point (second frame) match each other, the header rewriting unit 109 rewrites a idr_pic_id and a slice_type in the header of the trimmed encoded image 107, and outputs the resulting edited encoded image 110. Note that a specific header rewriting method performed by the header rewriting unit 109 will be described later.

Figure 2:
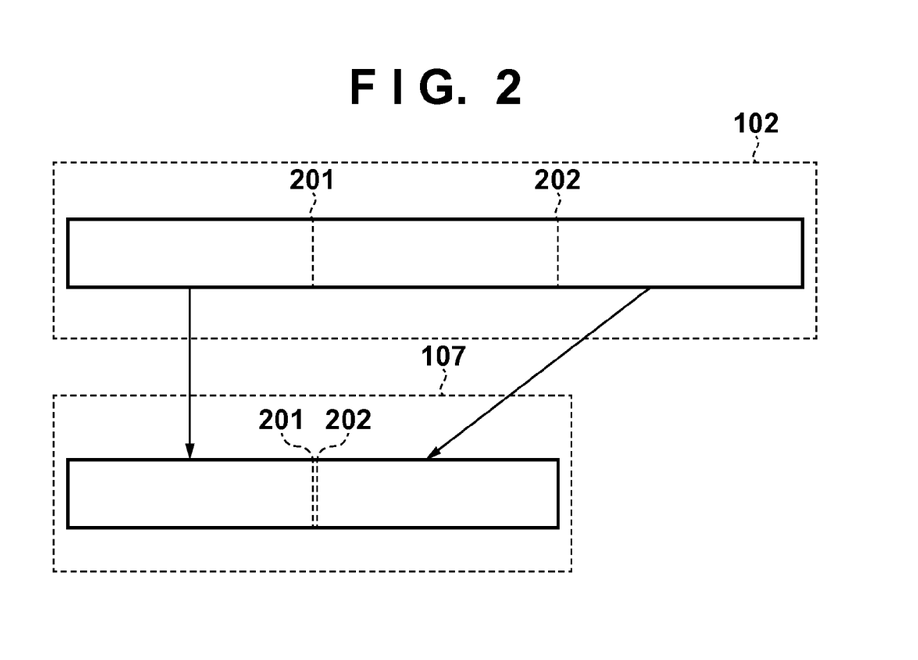
FIG. 2 is a diagram for describing a trimmed encoded image according to Embodiment 1 of the invention.

The following describes the trimmed encoded image 107 of Embodiment 1 with reference to FIG. 2. The encoded image deletion unit 106 in FIG. 1 generates the trimmed encoded image 107 by deleting the encoded image portion in the deletion range (e.g., the range from a deletion start point 201 to a deletion end point 202) instructed by the deletion range setting unit 105.

In order to enable an idr_pic_id to be changed to a non-duplicate value, the value of the idr_pic_id needs to be at least five bits or more. However, there is no guarantee that the idr_pic_id will always be five bits or more. In view of this, in the present embodiment, in order to prevent the idr_pic_id from not being able to have a value of five bits or more, surplus bits are provided by changing the Golomb-coded slice_type, and the surplus bits are allocated to the idr_pic_id.

According to the H.264 standard, in the case where all of the frames are of the IDR picture type, the slice_type can take the value of 2 or 7. Here, "2" signifies that "slice header setting is effective for only this slice". On the other hand, "7" signifies that "slice header setting is effective for slices in frame". The value of "7" is sufficient in the case where there is only one slice in the frame, and in the case where even if there are multiple slices, settings are not changed in-picture (i.e., the settings are the same for multiple slices). In view of this, in the present invention, slice_type=7 (first slice type) is set when performing stream generation, and surplus bits are created by changing this setting to slice_type=2 (second slice type) when performing editing.

As shown in FIG. 8, the data value "7" is represented by seven bits in Golomb coding. The data value "2" is represented by three bits in Golomb coding. In view of this, in the case where the header is to be rewritten, slice_type is changed from "7" to "2" so as to be reduced by four bits, and those four bits can be allocated to the idr_pic_id.

Figure 3:
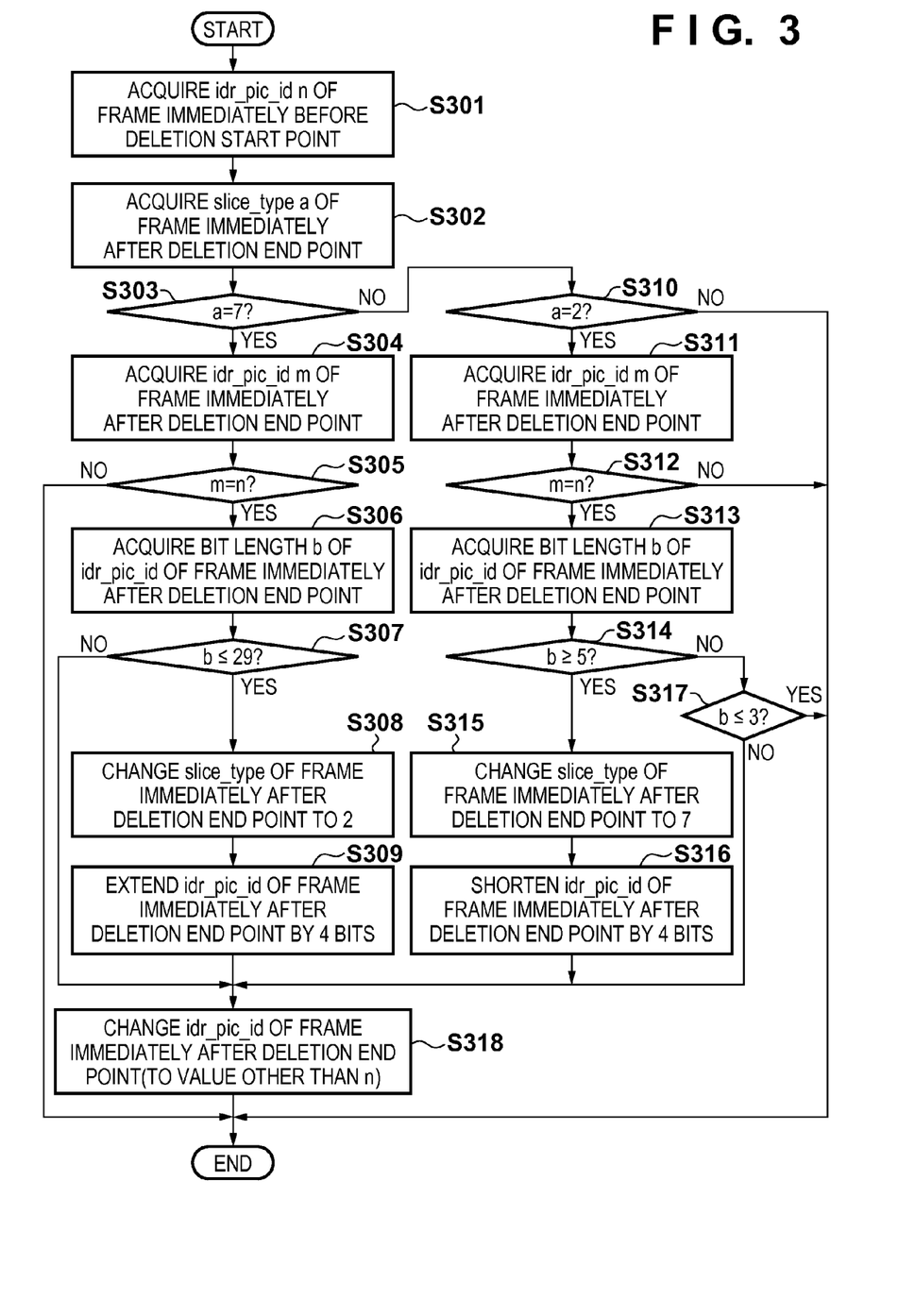
FIG. 3 is a flowchart showing an example of processing according to Embodiment 1 of the invention.
Figure 4:
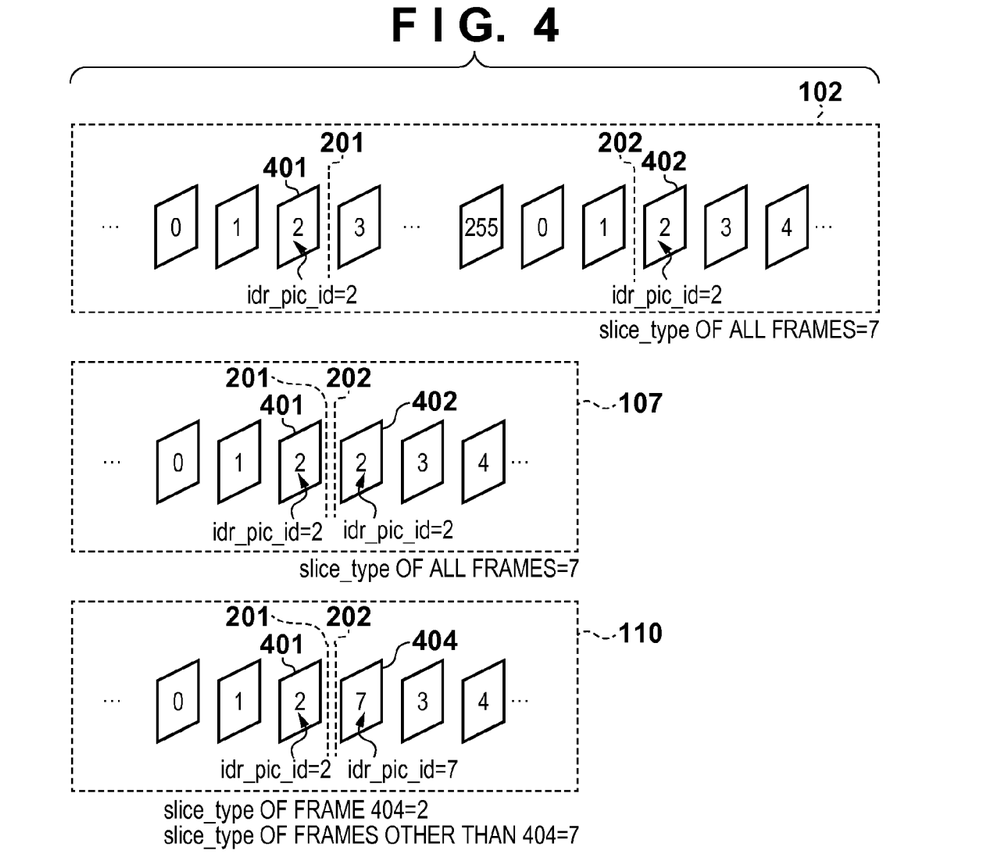
FIG. 4 is a diagram for describing header analysis processing and header rewrite processing according to Embodiment 1 of the invention.

Next, operations in header analysis processing performed by the header analysis unit 108 in FIG. 1 and header rewrite processing performed by the header rewriting unit 109 will be described in detail with reference to FIGS. 3 and 4. FIG. 3 is a flowchart showing the flow of control operations performed by the header analysis unit 108 and the header rewriting unit 109. The processing corresponding to these flowcharts can be realized by, for example, a processor that functions as the header analysis unit 108 and the header rewriting unit 109 executing corresponding programs (stored in a ROM or the like in the apparatus). FIG. 4 shows an example of the configuration of the stream contents of the encoded image 102, the trimmed encoded image 107, and the edited encoded image 110 shown in FIG. 2, in units of frames.

In step S301 in FIG. 3, the header rewriting unit 109 acquires the idr_pic_id of the frame immediately before the slice deletion start point from the header analysis unit 108. Here, let "n" be the value of the acquired idr_pic_id. Assuming that the encoded image 102 is configured as shown in FIG. 4, the idr_pic_id of a frame 401 immediately before the deletion start point 201 in the encoded image 102 in FIG. 4 has the value of "2", that is to say, n=2.

In step S302 in FIG. 3, the header rewriting unit 109 acquires the slice_type of the frame immediately after the deletion end point from the header analysis unit 108. Here, let "a" be the value of the acquired slice_type. For example, the slice_type of a frame 402 immediately after the deletion end point 202 in FIG. 4 has the value of "7", that is to say, a=7.

In step S303, the header rewriting unit 109 determines whether or not the value a of the slice_type of the frame immediately after the deletion end point, which was acquired in step S302, is "7". If the value a of the slice_type of the frame immediately after the deletion end point is "7" ("YES" in step S303), the procedure moves to step S304. On the other hand, if the value a of the slice_type of the frame immediately after the deletion end point is not "7" ("NO" in step S303), the procedure moves to step S310. For example, since the slice_type of the frame 402 immediately after the deletion end point 202 in FIG. 4 is "7", the procedure moves to step S304.

In step S304, the header rewriting unit 109 acquires the idr_pic_id of the frame immediately after the deletion end point from the header analysis unit 108. Let "m" be the value of the acquired idr_pic_id. For example, the idr_pic_id of the frame 402 immediately after the deletion end point 202 in FIG. 4 is acquired. Here, the acquired idr_pic_id is "2", that is to say, m=2.

In step S305, the header rewriting unit 109 compares the value n of the idr_pic_id of the frame immediately before the deletion start point, which was acquired in step S301, with the value m of the idr_pic_id of the frame immediately after the deletion end point, which was acquired in step S304. If n and m do not match ("NO" in step S305), this processing ends because the idr_pic_id does not need to be altered. On the other hand, if n and m match ("YES" in step S305), the procedure moves to step S306. For example, the idr_pic_id of the frame 401 immediately before the deletion start point 201 of the trimmed encoded image 107 in FIG. 4 and the idr_pic_id of the frame 402 immediately after the deletion end point 202 are both "2" and match each other, and therefore the procedure moves to step S306.

In step S306, the header rewriting unit 109 acquires the bit length of the idr_pic_id of the frame immediately after the deletion end point from the header analysis unit 108. Let "b" be the bit length of the acquired idr_pic_id. For example, the bit length of the idr_pic_id of the frame 402 immediately after the deletion end point 202 in FIG. 4 is acquired. According to the relationship between Golomb codes and data value ranges in FIG. 8, it is understood that the bit length of the acquired idr_pic_id is 3 bits.

In step S307, the header rewriting unit 109 determines whether or not the bit length b of the idr_pic_id of the frame immediately after the deletion end point, which was acquired in step S306, is less than or equal to 29 bits, which is a first bit length. According to the H.264 standard, the maximum bit length of idr_pic_id is 33 bits, and an existing idr_pic_id cannot be extended by four bits if it is 30 bits or longer. In other words, the first bit length is a value determined based on the difference between the bit lengths of the two slice types and the maximum bit length of the idr_pic_id. In step S307, it is determined whether or not this case applies to the encoded image 102 targeted for processing. If the bit length b of the idr_pic_id of the frame immediately after the deletion end point is less than or equal to the first bit length ("YES" in step S307), the procedure moves to step S308. In step S307, if the bit length b of the idr_pic_id of the frame immediately after the deletion end point is greater than 29 bits ("NO" in step S307), the header rewriting unit 109 moves to step S318. For example, the bit length of the idr_pic_id of the frame 402 immediately after the deletion end point 202 in FIG. 4 is 3 bits, which is less than or equal to 29 bits, and therefore the procedure moves to step S308.

In step S308, the header rewriting unit 109 changes the slice_type of the frame immediately after the deletion end point from "7" to "2". Performing this processing enables obtaining four surplus bits. For example, only the slice_type of the frame 402 immediately after the deletion end point 202 in FIG. 4 is changed from "7" to "2". In subsequent step S309, the header rewriting unit 109 extends the bit length of the idr_pic_id of the frame immediately after the deletion end point by four bits. For example, the bit length of the idr_pic_id of the frame 402 immediately after the deletion end point 202 in FIG. 4 is extended by four bits, thus being changed from 3 bits to 7 bits. The procedure then moves to step S318.

After a negative determination is made in step S303, in step S310, the header rewriting unit 109 determines whether or not the value a of the slice_type of the frame immediately after the deletion end point, which was acquired in step S302, is "2". What should be taken into consideration here is the fact that the slice_type was set to "7" when the encoded image 102 was created. In other words, if the slice_type was "2", that frame can be considered to have been edited in the past. In other words, it can be considered that the idr_pic_id was already extended by four bits. In view of this, if the value a of the slice_type of the frame immediately after the deletion end point is "2" ("YES" in step S310), the procedure moves to step S311. On the other hand, if the value a of the slice_type of the frame immediately after the deletion end point is not "2" ("NO" in step S310), the encoded image 102 does not apply to the present invention, and this processing ends.

In subsequent step S311, the header rewriting unit 109 acquires the idr_pic_id of the frame immediately after the deletion end point from the header analysis unit 108. Let "m" be the value of the acquired idr_pic_id. In step S312, the header rewriting unit 109 compares n of the idr_pic_id of the frame immediately before the deletion start point, which was acquired in step S301, with m of the idr_pic_id of the frame immediately after the deletion end point, which was acquired in step S311. If the two do not match ("NO" in step S312), there is no need to alter the idr_pic_id, and therefore this processing ends. On the other hand, if the two match ("YES" in step S312), the procedure moves to step S313.

In step S313, the header rewriting unit 109 acquires the bit length of the idr_pic_id of the frame immediately after the deletion end point from the header analysis unit 108. Let "b" be the bit length of the acquired idr_pic_id. In subsequent step S314, the header rewriting unit 109 determines whether or not the bit length b of the idr_pic_id of the frame immediately after the deletion end point, which was acquired in step S313, is greater than or equal to 5 bits, which is a second bit length. This is because the lowest bit length that the idr_pic_id can have is 1 bit. In other words, the second bit length is a value determined based on the difference between the bit lengths of the two slice types and the minimum bit length of the idr_pic_id.

If the bit length b of the idr_pic_id of the frame immediately after the deletion end point is greater than or equal to the second bit length ("YES" in step S314), the procedure moves to step S315. On the other hand, if the bit length b of the idr_pic_id of the frame immediately after the deletion end point is less than 5 ("NO" in step S314), the procedure moves to step S317.

In step S315, the header rewriting unit 109 changes the slice_type of the frame immediately after the deletion end point from "2" to "7". In subsequent step S316, the header rewriting unit 109 shortens the bit length of the idr_pic_id of the frame immediately after the deletion end point by four bits. In step S317, the header rewriting unit 109 determines whether or not the bit length b of the idr_pic_id of the frame immediately after the deletion end point, which was acquired in step S313, is less than or equal to 3 bits. If the bit length b of the idr_pic_id of the frame immediately after the deletion end point is less than or equal to 3 bits ("YES" in step S317), the encoded image 102 does not apply to the present invention, and this processing ends. On the other hand, if the bit length b of the idr_pic_id of the frame immediately after the deletion end point is greater than 3 bits ("NO" in step S317), the procedure moves to step S318. In this case, the bit length b is 4 bits (third bit length).

In step S318, the header rewriting unit 109 changes the idr_pic_id of the frame immediately after the deletion end point. Note that the value of idr_pic_id of the frame immediately after the deletion end point is changed to a value that is different from the value n of the idr_pic_id of the frame immediately before the deletion start point.

Figure 10:
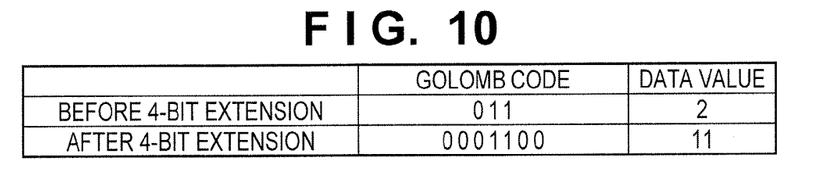
FIG. 10 is a diagram for describing the extension of the bit length of a picture identifier according to an embodiment of the invention.
Figure 11:
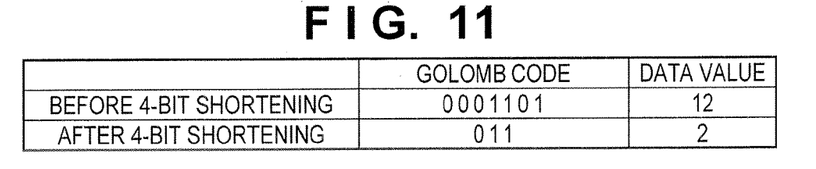
FIG. 11 is a diagram for describing the shortening of the bit length of a picture identifier according to an embodiment of the invention.

For example, in the case of changing the idr_pic_id of the frame 402 immediately after the deletion end point 202 in FIG. 4, the value is changed to "7", which is different from the value of "2" for the idr_pic_id of the frame immediately before the deletion start point. Although the idr_pic_id is changed from "2" to "7" in the present embodiment, the changed value need only be a value other than "2". Due to extending the idr_pic_id by four bits, the data value range shown in FIG. 8 increases from two types "1-2" to eight types "7-14". Accordingly, according to the present embodiment, the value of the idr_pic_id can be selected from among the eight types "7-14". As a result, in the edited encoded image 110 that is generated, the frame 402 having the idr_pic_id of "2" and the slice_type of "7" has been changed to the frame 404 having the idr_pic_id of "7" and the slice_type of "2". Note that FIG. 10 shows an example of Golomb codes and data values for an idr_pic_id before and after bit extending. In FIG. 10, the data value is changed from "2" to "11" due to being extended by four bits. Also, FIG. 11 shows an example of Golomb codes and data values for an idr_pic_id before and after bit shortening. In FIG. 11, the data value is changed from "12" to "2" due to being shortened by four bits.

Although idr_pic_id values are compared in steps S305 and S312 in the above description, there is also a method in which comparison itself is not performed. In other words, even if the idr_pic_id values do not match, the procedure may move to the next processing of step S306 or the processing of S313. Although the slice_type is always altered when operating in this way, there is an advantage of reducing the number of processing steps by reducing the number of times exception determination processing is performed.

Note that although the case where the encoded image is configured by frames that are all IDR (ALL-IDR picture) is described in the above description, the embodiments of the present invention are not limited to such a configuration. The present invention is applicable to any trimmed encoded image 107 that has the possibility of having adjacent IDR pictures after editing. In other words, the present invention is similarly applicable to any moving image that includes IDR pictures, and the present invention is not limited to only being applicable to a moving image configured by frames that are all IDR pictures.

According to the present embodiment described above, even if IDR pictures having the same picture identifier are consecutive after an encoded image is edited, picture identifier changing can be efficiently performed by changing the data in the header of one frame.

Embodiment 2

Embodiment 1 describes the case of performing editing by deleting one portion of the sequence of an input moving image. In contrast, Embodiment 2 describes the case of performing editing for generating a new moving image by combining two moving images.

Figure 5:
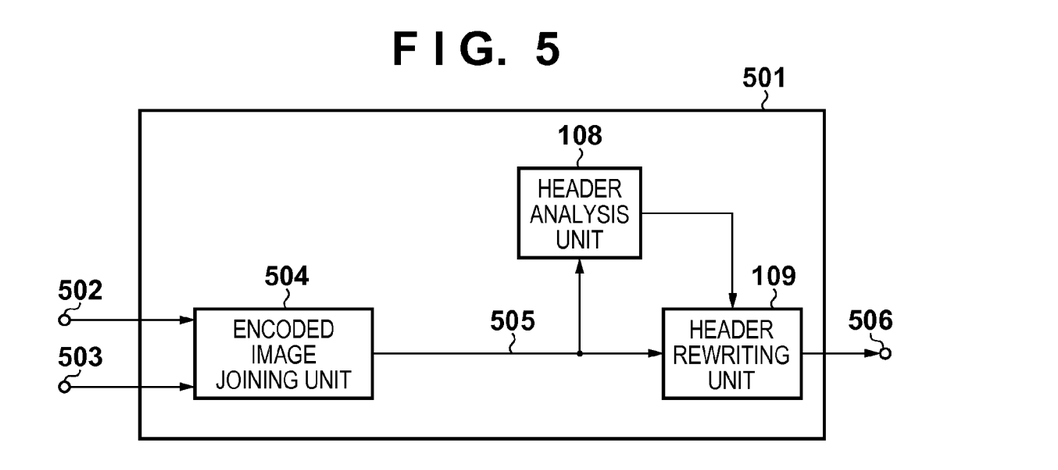
FIG. 5 is a block diagram showing an overview of the configuration of a moving image editing apparatus 501 according to Embodiment 2 of the invention.

FIG. 5 shows the configuration of a moving image editing apparatus as an image processing apparatus according to Embodiment 2 of the present invention. Encoded images 502 and 503 whose frames are all of the IDR picture type are input to a moving image editing apparatus 501, and an edited encoded image 506 is output. The moving image editing apparatus 501 has an encoded image joining unit 504 for generating a joined encoded image 505 from the encoded images 502 and 503, the header analysis unit 108, and the header rewriting unit 109. In the present embodiment, the encoded image joining unit 504 functions as a moving image editing unit. Note that the blocks of the moving image editing apparatus 501 in FIG. 5 may be configured by hardware, using dedicated logic circuits and memory. Alternatively, the blocks may be configured by software, through a computer including a CPU and the like executing processing programs stored in a memory.

Next, operations of the blocks shown in FIG. 5 will be described. The encoded image joining unit 504 joins the encoded images 502 and 503 that were input, and outputs the resulting joined encoded image 505. The header analysis unit 108 analyzes the header of the frame immediately before the joining point of the joined encoded image 505 and the header of the frame immediately after the joining point, that is to say, analyzes the headers of the frames that have become adjacent (successive) for the first time due to the joining. The header analysis unit 108 extracts idr_pic_id, which is the picture identifier, from the headers of the IDR pictures before and after the joining point, extracts slice_type, which is the slice type, from the headers of the frames before and after the joining point, and outputs them to the header rewriting unit 109.

The header rewriting unit 109 checks the acquired idr_pic_ids and slice_types. If the idr_pic_id of the frame immediately before the joining point (first frame) and the idr_pic_id of the frame immediately after the joining point (second frame) match each other, the header rewriting unit 109 rewrites a idr_pic_id and a slice_type in the header of the joined encoded image 505, and outputs the resulting edited encoded image 506. Note that a specific header rewriting method performed by the header rewriting unit 109 will be described later.

Figure 6:
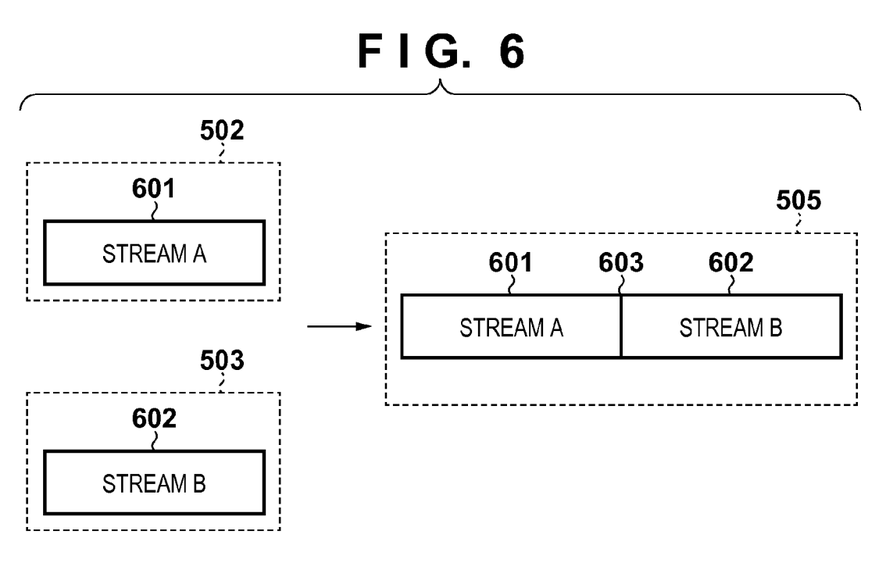
FIG. 6 is a diagram for describing a joined encoded image according to Embodiment 2 of the invention.

The following describes the joined encoded image 505 of Embodiment 2 with reference to FIG. 6. Firstly, the encoded image 502 is constituted by a stream A (601), and the encoded image 503 is constituted by a stream B (602). The present embodiment describes the case where the encoded image joining unit 504 generates the joined encoded image 505 by joining the stream B (602) to the end of the stream A (601). Note that a joining point 603 is the boundary between the stream A (601) and the stream B (602) in the joined encoded image 505.

Figure 7:
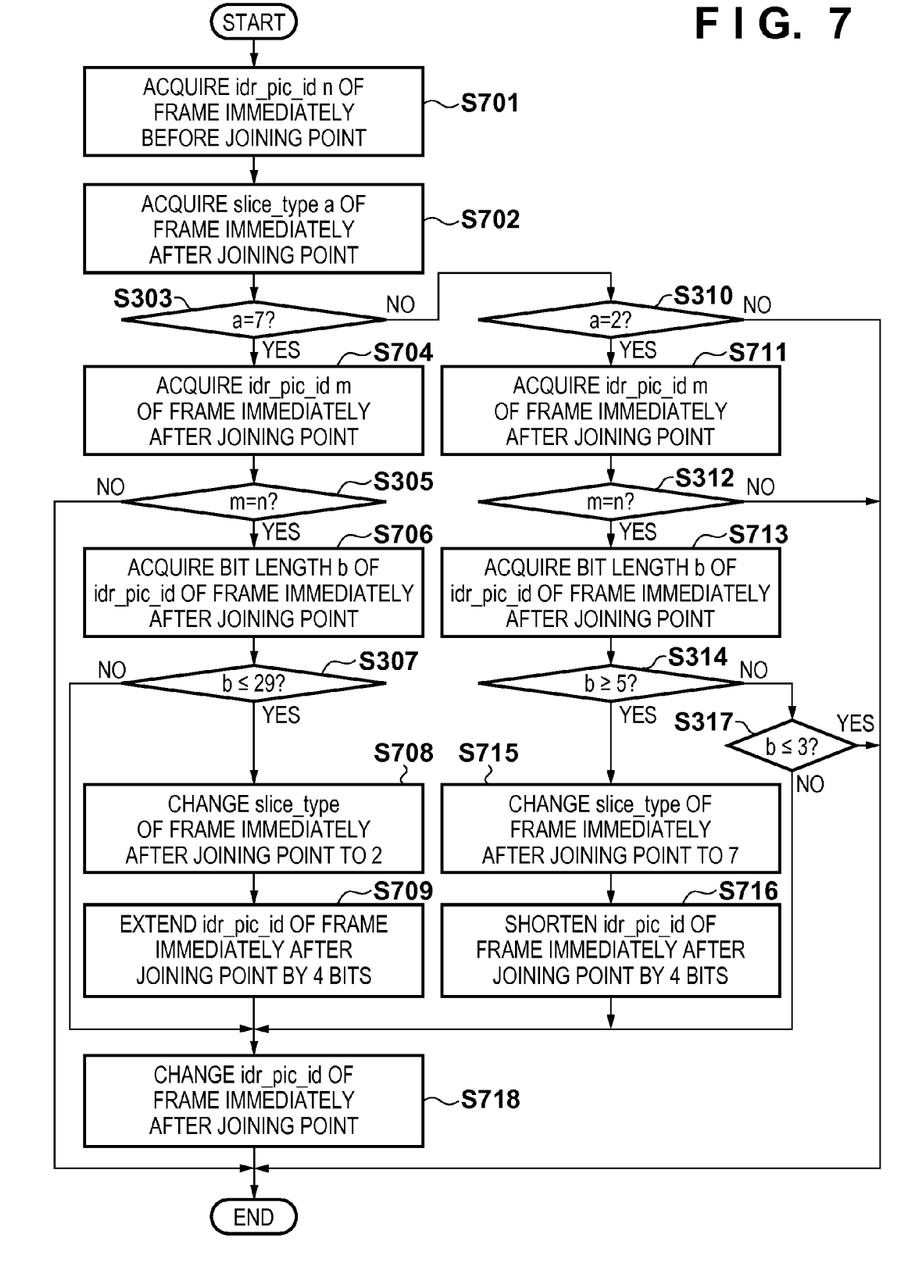
FIG. 7 is a flowchart showing an example of processing according to Embodiment 2 of the invention.

Next, operations in header analysis processing performed by the header analysis unit 108 in FIG. 5 and header rewrite processing performed by the header rewriting unit 109 will be described in detail with reference to FIG. 7. FIG. 7 is a flowchart showing the flow of control operations performed by the header analysis unit 108 and the header rewriting unit 109. The processing corresponding to these flowcharts can be realized by, for example, a processor that functions as the header analysis unit 108 and the header rewriting unit 109 executing corresponding programs (stored in a ROM or the like in the apparatus). Note that among the steps shown in FIG. 7, the steps denoted by the same reference signs as those in FIG. 3 are steps for executing the same processing as that shown in FIG. 3.

In step S701 in FIG. 7, the header rewriting unit 109 acquires the idr_pic_id of the frame immediately before the joining point from the header analysis unit 108. Here, let "n" be the value of the acquired idr_pic_id. In subsequent step S702, the header rewriting unit 109 acquires the slice_type of the frame immediately after the joining point. Let "a" be the value of the acquired slice_type.

In step S303, the header rewriting unit 109 determines whether or not the value a of the slice_type of the frame immediately after the joining point, which was acquired in step S702, is "7". If the value a of the slice_type of the frame immediately after the joining point is "7" ("YES" in step S303), the procedure moves to step S704. On the other hand, if the value a of the slice_type of the frame immediately after the joining point is not "7" ("NO" in step S303), the procedure moves to step S310.

In step S704, the header rewriting unit 109 acquires the idr_pic_id of the frame immediately after the joining point from the header analysis unit 108. Here, let "m" be the value of the acquired idr_pic_id. In subsequent step S305, the header rewriting unit 109 compares the value n of the idr_pic_id of the frame immediately before the joining point, which was acquired in step S701, with the value m of the idr_pic_id of the frame immediately after the joining point, which was acquired in step S704. If n and m do not match ("NO" in step S305), this processing ends because the idr_pic_id does not need to be altered. On the other hand, if n and m match ("YES" in step S305), the procedure moves to step S706.

In step S706, the header rewriting unit 109 acquires the bit length of the idr_pic_id of the frame immediately after the joining point from the header analysis unit 108. Let "b" be the bit length of the acquired idr_pic_id. In subsequent step S307, the header rewriting unit 109 determines whether or not the bit length b of the idr_pic_id of the frame immediately after the joining point, which was acquired in step S706, is less than or equal to 29 bits. If the bit length b of the idr_pic_id of the frame immediately after the joining point is less than or equal to 29 bits ("YES" in step S307), the procedure moves to step S708. On the other hand, if the bit length b of the idr_pic_id of the frame immediately after the joining point is greater than 29 ("NO" in step S307), the procedure moves to step S718.

In step S708, the header rewriting unit 109 changes the slice_type of the frame immediately after the joining point from "7" to "2". Performing this processing enables obtaining four surplus bits. In subsequent step S709, the header rewriting unit 109 extends the bit length of the idr_pic_id of the frame immediately after the joining point by four bits. The procedure then moves to step S718.

After a negative determination is made in step S303, in step S310, the header rewriting unit 109 determines whether or not the value a of the slice_type of the frame immediately after the joining point, which was acquired in step S702, is "2". What should be taken into consideration here is the fact that the slice_type was set to "7" when the encoded images 502 and 503 were created. In other words, if the slice_type was "2", that frame can be considered to have been edited in the past. In other words, it can be considered that the idr_pic_id was already extended by four bits. In view of this, if the value a of the slice_type of the frame immediately after the joining point is "2" ("YES" in step S310), the procedure moves to step S711. On the other hand, if the value a of the slice_type of the frame immediately after the joining point is not "2" ("NO" in step S310), the encoded images 502 and 503 do not apply to the present invention, and this processing ends.

In subsequent step S711, the header rewriting unit 109 acquires the idr_pic_id of the frame immediately after the joining point from the header analysis unit 108. Let "m" be the value of the acquired idr_pic_id. In step S312, the header rewriting unit 109 compares the value n of the idr_pic_id of the frame immediately before the joining point, which was acquired in step S701, with the value m of the idr_pic_id of the frame immediately after the joining point, which was acquired in step S711. If the two do not match ("NO" in step S312), this processing ends because the idr_pic_id does not need to be altered. On the other hand, if the two match ("YES" in step S312), the procedure moves to step S713.

In step S713, the header rewriting unit 109 acquires the bit length of the idr_pic_id of the frame immediately after the joining point from the header analysis unit 108. Let "b" be the bit length of the acquired idr_pic_id. In subsequent step S314, the header rewriting unit 109 determines whether or not the bit length b of the idr_pic_id of the frame immediately after the joining point, which was acquired in step S713, is greater than or equal to 5 bits. If the bit length b of the idr_pic_id of the frame immediately after the joining point is greater than or equal to 5 bits ("YES" in step S314), the procedure moves to step S715. On the other hand, if the bit length b of the idr_pic_id of the frame immediately after the joining point is less than 5 bits ("NO" in step S314), the procedure moves to step S317.

In step S715, the header rewriting unit 109 changes the slice_type of the frame immediately after the joining point from "2" to "7". In subsequent step S716, the header rewriting unit 109 shortens the bit length of the idr_pic_id of the frame immediately after the joining point by four bits. On the other hand, in step S317, the header rewriting unit 109 determines whether or not the bit length b of the idr_pic_id of the frame immediately after the joining point, which was acquired in step S713, is less than or equal to 3 bits. If the bit length b of the idr_pic_id of the frame immediately after the joining point is less than or equal to 3 bits ("YES" in step S317), the encoded images 502 and 503 do not apply to the present invention, and this processing ends. On the other hand, if the bit length b of the idr_pic_id of the frame immediately after the joining point is greater than 3 bits ("NO" in step S317), the procedure moves to step S718. Note that the bit length b is 4 bits in this case. In step S718, the idr_pic_id of the frame immediately after the joining point is changed.

Note that although idr_pic_id values are compared in steps S305 and S312 in the above description, there is also a method in which comparison itself is not performed. In other words, even if the idr_pic_id values do not match, the procedure may move to the next processing of step S706 or the processing of S713. Although the slice_type is always altered when operating in this way, there is an advantage of reducing the number of processing steps by reducing the number of times exception determination processing is performed.

Note that although the case where the encoded image is configured by frames that are all IDR (ALL-IDR picture) is described in the above description, the embodiments of the present invention are not limited to such a configuration. The present invention is applicable to any joined encoded image 505 that has the possibility of having adjacent IDR pictures after editing. In other words, the present invention is similarly applicable to any moving image that includes IDR pictures, and the present invention is not limited to only being applicable to a moving image configured by frames that are all IDR pictures.

According to the present embodiment described above, even if IDR pictures having the same picture identifier are consecutive after encoded images are joined, picture identifier changing can be efficiently performed by changing the data in the header of one frame.

Embodiment 3

Next, Embodiment 3 will be described as a variation of Embodiment 1, with reference to FIGS. 12 and 13. FIG. 13 is a flowchart showing a flow of control operations performed by the header analysis unit 108 and the header rewriting unit 109. In these figures, steps denoted by the same reference signs as those in FIG. 3 are steps for executing the same processing as that shown in FIG. 3. A difference in the processing in FIG. 12 is that steps S1201 and S1202 are provided in place of step S318 in FIG. 3.

FIG. 13 shows the stream contents of a trimmed encoded image 1305 and a re-edited encoded image 1306 in units of frames in the case where the edited encoded image 110 subjected to the processing of Embodiment 1 is then edited again. Elements in this figure that correspond to elements shown in FIG. 4 are denoted by the same reference signs, and the descriptions given above apply in the same manner. The edited encoded image 110 in FIG. 13 is an edited encoded image that has already been subjected to the processing of Embodiment 1. The deletion range in the encoded image in FIG. 13 is from a deletion start point 1303 to a deletion end point 1304. The idr_pic_id of a frame 1301 (first frame) immediately before the deletion start point 1303 in FIG. 13 is "2", and the idr_pic_id of a frame 401 (second frame) immediately after the deletion end point is also "2". Only differences from Embodiment 1 will be described below.

Figure 12:
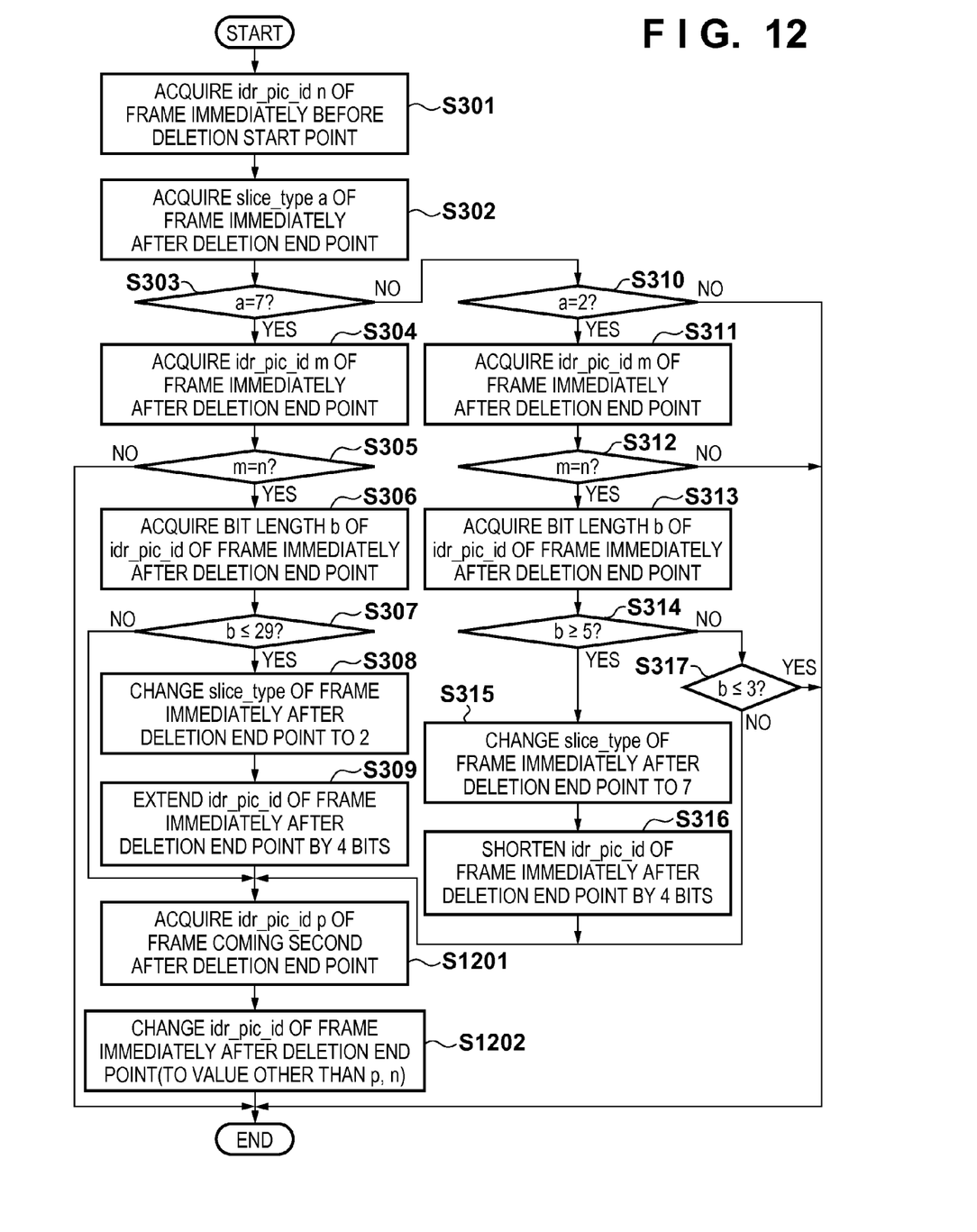
FIG. 12 is a flowchart showing an example of processing according to Embodiment 3 of the invention.
Figure 13:
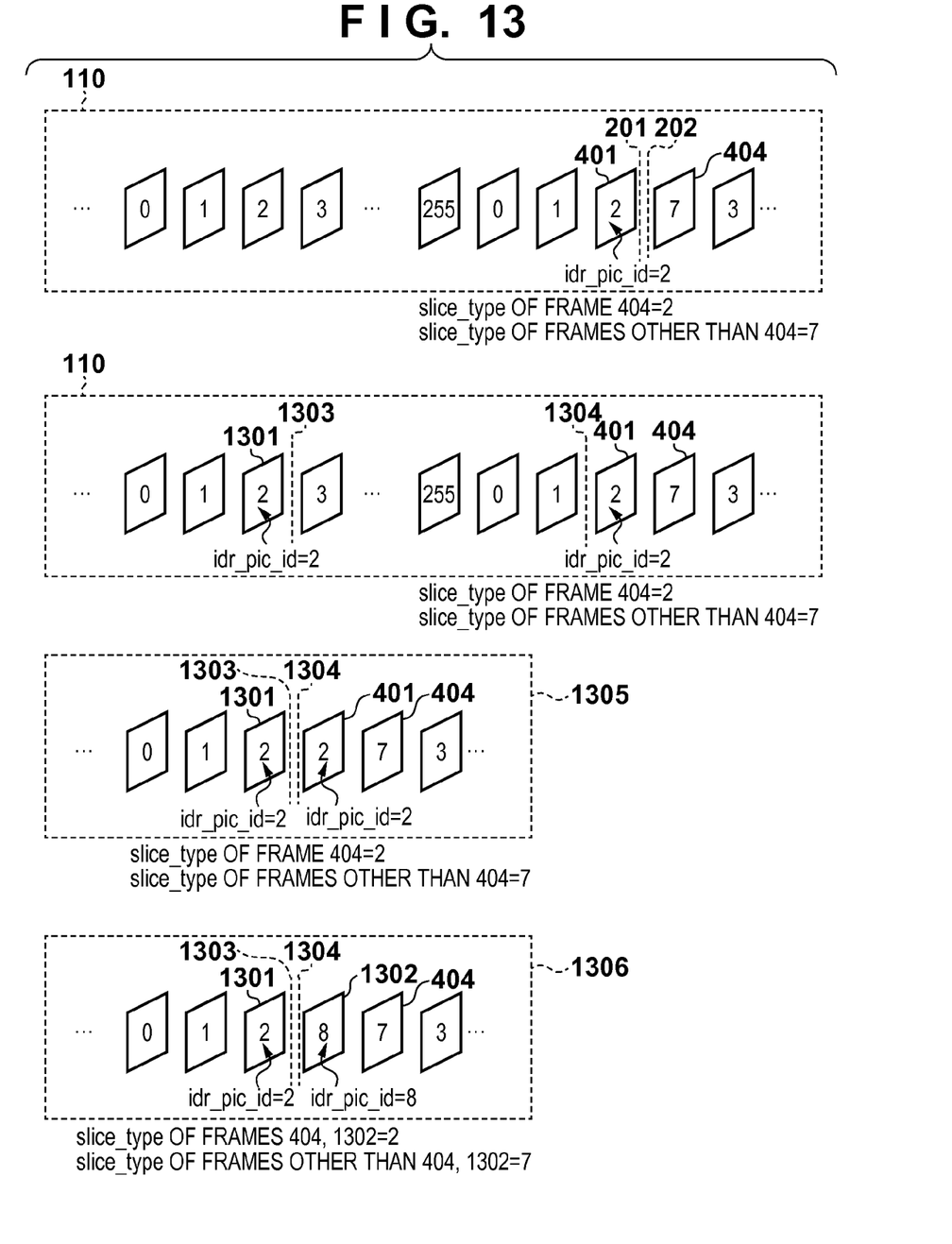
FIG. 13 is a diagram for describing header analysis processing and header rewrite processing according to Embodiment 3 of the invention.

In step S1201 in FIG. 12, the header rewriting unit 109 acquires, from the header analysis unit 108, the idr_pic_id of the frame that comes second after the deletion end point (third frame). Let "p" be the value of the acquired idr_pi-c_id. For example, the header rewriting unit 109 acquires the idr_pic_id of the frame 404 that comes second after the deletion end point 1304 in FIG. 13. The value of the acquired idr_pic_id is "7". In subsequent step S1202, the header rewriting unit 109 changes the idr_pic_id of the frame immediately after the deletion end point. Note that the value of idr_pic_id of the frame immediately after the deletion end point is changed to a value that is different from the value n of the idr_pic_id of the frame immediately before the deletion start point and the value p of the idr_pic_id of the frame that comes second after the deletion end point.

For example, consider the example of changing the idr_pic_id of the frame 401 immediately after the deletion end point 1304 in FIG. 13. In this case, the changed value needs to be different from the value "2" of the idr_pic_id of the frame 1301 immediately before the deletion start point and the value "7" of the idr_pic_id of the frame 404 that comes second after the deletion end point, and FIG. 13 shows the case where the value is changed to "8". As a result, in the re-edited encoded image 1306 that is generated, the frame 401 having the idr_pic_id of "2" and the slice_type of "7" has been changed to a frame 1302 having the idr_pic_id of "8" and the slice_type of "2".

Note that in Embodiment 2 as well, executing steps S1201 and S1202 in place of step S718 enables avoiding the situation in which the idr_pic_id of the frame immediately after the joining point and the idr_pic_id of the subsequent frame are the same.

According to this present embodiment described above, it is also possible to prevent the picture identifier of the frame whose header is to be rewritten and the picture identifier of the subsequent frame from being the same in an edited encoded image.

Although embodiments of the invention have been described above, the invention is not limited to these embodiments, and various changes and modifications can be made within the scope of the gist of the invention. Note that the moving image editing apparatus described in Embodiments 1 to 3 may be, for example, any apparatus that can handle moving images, such as a camera, a mobile phone, or a personal computer.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiments of the present invention, and by a method performed by the computer of the system or apparatus by, for example, reading out and executing the computer executable instructions from the storage medium to perform the functions of one or more of the above-described embodiments. The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-192292, filed Aug. 31, 2012, which is hereby incorporated by reference herein in its entirety.

What is claimed is:

1. An image processing apparatus comprising:
a CPU;
a combining unit configured to combine a first moving image with a second moving image;
an acquisition unit configured to acquire a slice type and a picture identifier of a first frame in the first moving image and a slice type and a picture identifier of a second frame in the second moving image, wherein the first frame and the second frame are frames that were not adjacent before the combining performed by the combining unit and are adjacent to each other after the combining; and
a changing unit configured to change, in a case where the picture identifier of the first frame and the picture identifier of the second frame match, both the picture identifier and the slice type of the second frame,
wherein in a case where the picture identifier of the first frame and the picture identifier of the second frame match and the slice type of the second frame is a first slice type, the changing unit changes the picture identifier of the second frame to a predetermined picture identifier having a bit length longer than the matched identifier and changes the slice type of the second frame to a second slice type having a bit length shorter than the first slice type,
wherein a function of at least one of the combining unit, the acquisition unit and the changing unit is performed by the CPU, and
wherein the predetermined picture identifier has a bit length that is an n-bit longer than the matched identifier, and the second slice type has a bit length that is an n-bit shorter than the first slice type.

2. The image processing apparatus according to claim 1, wherein the first frame is displayed prior to the second frame in the combined moving image.

3. The image processing apparatus according to claim 1, wherein the second frame is displayed prior to the first frame in the combined moving image.

4. The image processing apparatus according to claim 1, wherein the first frame is a picture obtained by intra-frame predictive encoding, and the second frame is a picture obtained by intra-frame predictive encoding.

5. The image processing apparatus according to claim 1, wherein the first frame is a frame that is an IDR picture specified by H.264 standard,
the second frame is a frame that is an IDR picture specified by H.264 standard, and
the picture identifier is an idr_pic_id of an IDR picture slice header.

6. A method of controlling an image processing apparatus, the image processing apparatus comprising:
a CPU;
a combining unit configured to combine a first moving image with a second moving image;
an acquisition unit configured to acquire a slice type and a picture identifier of a first frame in the first moving image and a slice type and a picture identifier of a second frame in the second moving image, wherein the first frame and the second frame are frames that were not adjacent before the combining performed by the combining unit and are adjacent to each other after the combining; and
a changing unit configured to change, in a case where the picture identifier of the first frame and the picture identifier of the second frame match, both the picture identifier and the slice type of the second frame,
wherein a function of at least one of the combining unit, the acquisition unit and the changing unit is performed by the CPU,
the method comprising the steps of:
determining whether the picture identifier of the first frame and the picture identifier of the second frame match and whether the slice type of the second frame is a first slice type; and
in a case where the picture identifier of the first frame and the picture identifier of the second frame match and the slice type of the second frame is a first slice type, controlling the changing unit so as to change the picture identifier of the second frame to a predetermined picture identifier having a bit length longer than the matched identifier and to change the slice type of the second frame to a second slice type having a bit length shorter than the first slice type,
wherein the predetermined picture identifier has a bit length that is an n-bit longer than the matched identifier, and the second slice type has a bit length that is an n-bit shorter than the first slice type.

7. An image processing apparatus comprising:
a CPU;
a combining unit configured to combine a first moving image with a second moving image;
an acquisition unit configured to acquire a slice type and a picture identifier of a first frame in the first moving image and a slice type and a picture identifier of a second frame in the second moving image, wherein the first frame and the second frame are frames that were not adjacent before the combining performed by the combining unit and are adjacent to each other after the combining; and
a changing unit configured to change, in a case where the picture identifier of the first frame and the picture identifier of the second frame match, both the picture identifier and the slice type of the second frame,
wherein in a case where the picture identifier of the first frame and the picture identifier of the second frame match and the slice type of the second frame is a second slice type, the changing unit changes the picture identifier of the second frame to a predetermined picture identifier having a bit length shorter than the matched identifier and changes the slice type of the second frame to a first slice type having a bit length longer than the second slice type,
wherein a function of at least one of the combining unit, the acquisition unit and the changing unit is performed by the CPU, and
wherein the predetermined picture identifier has a bit length that is an n-bit shorter than the matched identifier, and the second slice type has a bit length that is an n-bit longer than the first slice type.

8. The image processing apparatus according to claim 7, wherein the first frame is displayed prior to the second frame in the combined moving image.

9. The image processing apparatus according to claim 7, wherein the second frame is displayed prior to the first frame in the combined moving image.

10. The image processing apparatus according to claim 7, wherein the first frame is a picture obtained by intra-frame predictive encoding, and
the second frame is a picture obtained by intra-frame predictive encoding.

11. The image processing apparatus according to claim 7, wherein the first frame is a frame that is an IDR picture specified by H.264 standard,
the second frame is a frame that is an IDR picture specified by H.264 standard, and
the picture identifier is an idr_pic_id of an IDR picture slice header.

12. A method of controlling an image processing apparatus, the image processing apparatus comprising:
a CPU;
a combining unit configured to combine a first moving image with a second moving image,
an acquisition unit configured to acquire a slice type and a picture identifier of a first frame in the first moving image and a slice type and a picture identifier of a second frame in the second moving image, wherein the first frame and the second frame are frames that were not adjacent before the combining performed by the combining unit and are adjacent to each other after the combining, and
a changing unit configured to change, in a case where the picture identifier of the first frame and the picture identifier of the second frame match, both the picture identifier and the slice type of the second frame,
wherein a function of at least one of the combining unit, the acquisition unit and the changing unit is performed by the CPU,
the method comprising the steps of:
determining whether the picture identifier of the first frame and the picture identifier of the second frame match and whether the slice type of the second frame is a second slice type; and
in a case where the picture identifier of the first frame and the picture identifier of the second frame match and the slice type of the second frame is a second slice type, controlling the changing unit so as to change the picture identifier of the second frame to a predetermined picture identifier having a bit length shorter than the matched identifier and to change the slice type of the second frame to a first slice type having a bit length longer than the second slice type,
wherein the predetermined picture identifier has a bit length that is an n-bit shorter than the matched identifier, and the second slice type has a bit length that is an n-bit longer than the first slice type.

* * * * *